(12) United States Patent
Hoefnagels et al.

(10) Patent No.: US 8,535,467 B2
(45) Date of Patent: Sep. 17, 2013

(54) PROCESS FOR MANUFACTURING AN ANTI-BALLISTIC ARTICLE

(75) Inventors: Hen H. Hoefnagels, Hulsberg (NL); Albert A. Vunderink, Selfkant-Tüddern (DE)

(73) Assignee: DSM IP Assets B.V., Heerlen (NL)

( * ) Notice: Subject to any disclaimer, the term of this patent is extended or adjusted under 35 U.S.C. 154(b) by 295 days.

(21) Appl. No.: 12/921,467

(22) PCT Filed: Apr. 1, 2009

(86) PCT No.: PCT/EP2009/053864
§ 371 (c)(1), (2), (4) Date: Sep. 8, 2010

(87) PCT Pub. No.: WO2009/121902
PCT Pub. Date: Oct. 8, 2009

(65) Prior Publication Data
US 2011/0036235 A1   Feb. 17, 2011

(30) Foreign Application Priority Data
Apr. 2, 2008   (EP) .................................... 08006711

(51) Int. Cl.
*F41H 5/04* (2006.01)
*D04H 3/08* (2006.01)

(52) U.S. Cl.
USPC .............. 156/186; 156/90; 156/181; 156/285

(58) Field of Classification Search
USPC .................................... 156/186, 181, 285, 90
See application file for complete search history.

(56) References Cited

U.S. PATENT DOCUMENTS
6,893,704 B1    5/2005  Van Der Loo
2007/0194490 A1  8/2007  Bhatnagar et al.
2007/0281125 A1* 12/2007  Moore et al. .................... 428/71

FOREIGN PATENT DOCUMENTS
DE    10 2005 008 252    9/2006
EP    1428649              6/2004
WO    WO 2007/107359    *  9/2007

OTHER PUBLICATIONS
International Search Report for PCT/EP2009/053864, mailed Jul. 20, 2009.

* cited by examiner

*Primary Examiner* — Brent O'Hern
(74) *Attorney, Agent, or Firm* — Nixon & Vanderhye P.C.

(57) ABSTRACT

The invention relates to a process for the manufacture of an antiballistic article comprising the steps of forming a stack of sheets by stacking 2 or more sheets, each sheet comprising one or more mono-layers of anti-ballistic fibers and optionally a thermoplastic binder, followed by subjecting the stack of sheets to a reduced atmospheric pressure environment; and while maintaining the reduced atmospheric pressure environment, consolidating said stack of sheets to a pressure of at least 10 MPa at an elevated temperature. The invention also relates to an anti-ballistic article.

18 Claims, 1 Drawing Sheet

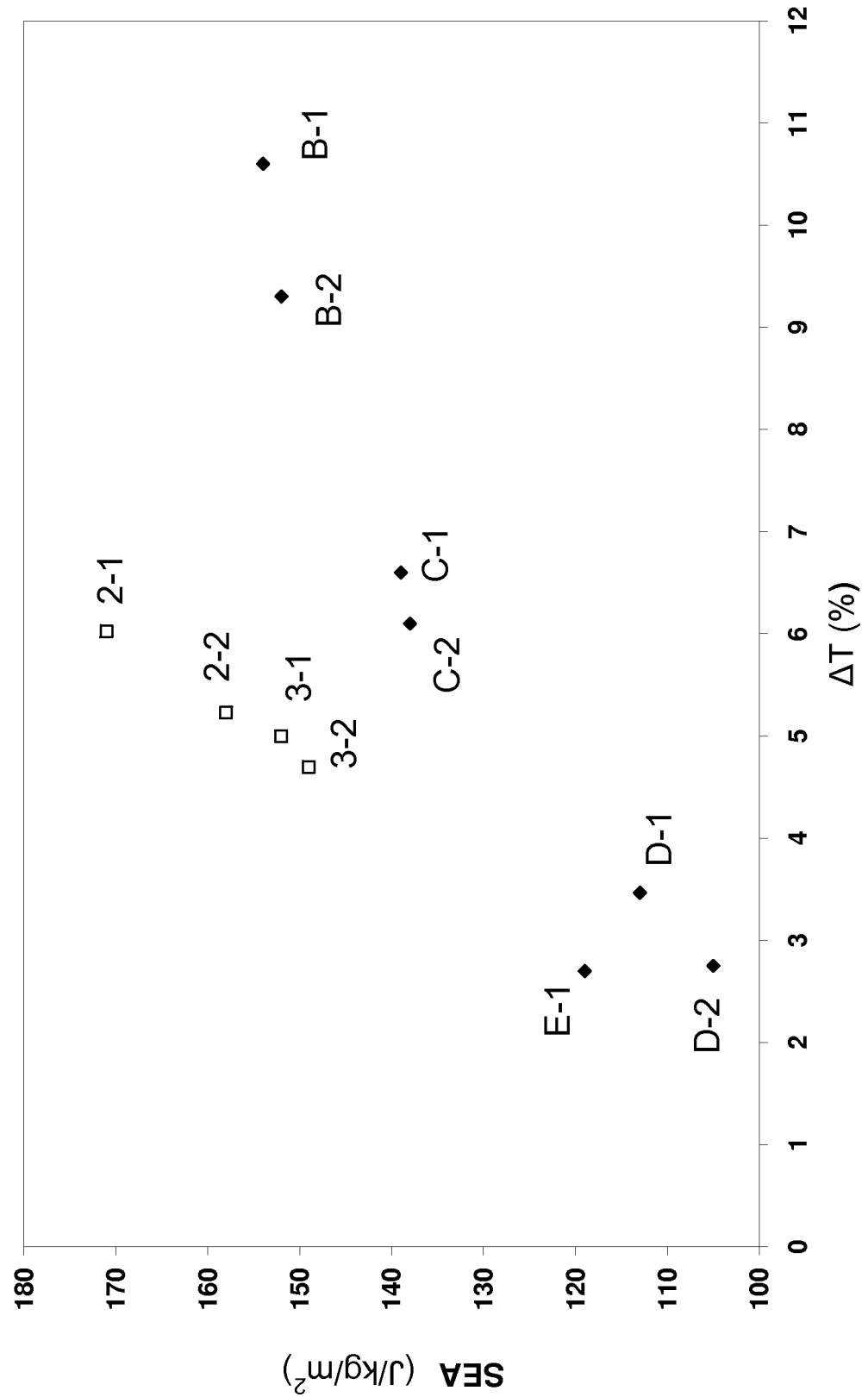

PROCESS FOR MANUFACTURING AN ANTI-BALLISTIC ARTICLE

This application is the U.S. national phase of International Application No. PCT/EP2009/053864 filed 1 Apr. 2009, which designated the U.S. and claims priority to EP Application No. 08006711.9 filed 2 Apr. 2008, the entire contents of each of which are hereby incorporated by reference.

FIELD

The invention relates to a process for the manufacture of an anti-ballistic article formed from a stack of sheets, each sheet comprising one or more monolayers of anti-ballistic fibers. The invention also relates to anti-ballistic articles and the use of vacuum bags in the manufacture of anti-ballistic articles.

BACKGROUND AND SUMMARY

There is an increasing demand for anti-ballistic articles which provide greater performance per given areal density. For example, the increasing amount of electronic surveillance equipment which is mounted upon military helmets has lead to the problem of heavy and cumbersome helmets and consequently a desire for lighter weight helmets which deliver the same anti-ballistic performance. Further, to provide enhanced ballistic protection to vehicles there has been a need to increase the thickness of the anti-ballistic layers to a point where the anti-ballistic layering is beginning to compromise the maneuverability and handling of the vehicle. In addition to increased anti-ballistic performance, the growing demand for anti-ballistic articles has also lead to the need for shorter production cycle times to enable increased production capacity.

Anti-ballistic articles may also be frequently exposed to high temperatures for long durations. It is important that anti-ballistic articles have sufficient dimensional stability to maintain their shape, such that their functional performance is not compromised. One example is anti-ballistic panels positioned adjacent to an automotive engine. Anti-ballistic panels for vehicles are necessarily thick to achieve the required anti-ballistic performance and even small dimensional changes in the anti-ballistic panels may result in the panels exerting pressures on the vehicle's framework, thus compromising the vehicle's structural integrity. Another example is helmets and vests subject to a hot environment (e.g. in a vehicle's trunk). Thus, anti-ballistic articles designed for such personal protection which are subjected to a hot environment should also have good dimensional stability to ensure that they retain a comfortable fit against the wearer's body.

An object of the present invention is to provide an anti-ballistic article and a process for the manufacture of an anti-ballistic article which overcomes at least some of the above-mentioned problems.

This object is achieved with a process for the manufacture of an anti-ballistic article comprising the steps of a. forming a stack of sheets ("a stack") by stacking 2 or more sheets, each sheet comprising one or more mono-layers of anti-ballistic fibers and optionally a thermoplastic binder, followed by b. subjecting the stack of sheets to a reduced atmospheric pressure environment; and c. while maintaining the reduced atmospheric pressure environment, subjecting said stack of sheets to a pressure of at least 10 MPa at an elevated temperature.

It has been surprising found that the application of a reduced atmospheric pressure environment to the stack whilst the stack is compressed at an elevated temperature produces a surprising increase in anti-ballistic performance, as measure by the specific energy absorption (SEA) of the material. Preferably, the sheets are unidirectional sheets whereby in the stack, the direction of the anti-ballistic fibers in a monolayer is at an angle $\alpha$ to the fiber direction in an adjacent monolayer. However, other assemblies and orientations of fibers may also be employed. For example, in another embodiment the sheet is a woven sheet.

The present process solves the problem of providing improved anti-ballistic performance.

The present invention provides several additional advantages derived from the resultant increase in SEA of the stack:

1. An anti-ballistic article with increased anti-ballistic performance relative to conventionally produced anti-ballistic articles may be produced having the same areal density; and
2. A lighter more compact anti-ballistic article may be produced with the same anti-ballistic performance as a stack produced via conventional techniques.

BRIEF DESCRIPTION OF THE DRAWINGS

FIG. 1 is a graph of SEA ($J/kg/m^2$) vs. $\Delta T$ (%) for the results obtained in the Examples and Comparative Examples below.

DETAILED DESCRIPTION

In one embodiment of the present invention, there is provided an anti-ballistic article comprising a stack of sheets, each sheet comprising one or more mono-layers of polyethylene anti-ballistic fibers and a thermoplastic binder, characterized in that the specific energy absorption (SEA) of the anti-ballistic article is greater than 145 $J/kg/m^2$ and the maximum % thickness increase, measured at about 90° C., is less than 8% after storing the article for 160 hours at 90° C.

Preferably the SEA is greater than 147 $J/kg/m^2$, more preferably greater than 149 $J/kg/m^2$, even more preferably greater than 151 $J/kg/m^2$ and most preferably greater than 153 $J/kg/m^2$. The maximum % thickness change is less than 7.5%, more preferably less than 7.0%, even more preferably less than 6.5% and most preferably less than 6.0%.

It has been found that the anti-ballistic articles of the present invention may be produced through the application of vacuum and pressure as previously described.

It will be appreciated that different embodiments describing the anti-ballistic article made in reference to the process are also applicable to embodiments describing the anti-ballistic article alone.

Stack

The anti-ballistic article according to the invention comprises a stack of sheets. A sheet may include a woven or a non-woven sheet (i.e. felt construction) derived from anti-ballistic fibers in addition to a stack of monolayers derived from anti-ballistic fibers.

Preferably, these sheets are unidirectional sheets which comprise one or more mono-layers of unidirectional oriented anti-ballistic fibers and a binder.

The term mono-layer of unidirectional anti-ballistic fibers refers to a layer of unidirectionally oriented anti-ballistic fibers i.e. anti-ballistic fibers in one plane that are essentially oriented in parallel. Within this aspect of the invention, the direction of the fibers in a monolayer is preferably at an angle $\alpha$ to the direction of the fibers in an adjacent mono-layer. The angle α is preferably between 5 and 90°, more preferably between 45 and 90° and most preferably between 75 and 90°.

The article according to the invention comprises at least 2 sheets, preferably at least 40 sheets, more preferably at least 80 sheets, even more preferably at least 120 sheets and most preferably at least 160 sheets The term anti-ballistic fiber comprises not only a monofilament but, inter alia, also a multifilament yarn and a tape.

Fiber Formation

The anti-ballistic fibers in the stack according to the invention preferably have a tensile strength of at least about 1.2 GPa (determined in accordance with ASTM D2256) and a tensile modulus of at least 40 GPa. These fibers preferably have a tensile strength of at least 2 GPa, more preferably at least 2.5 GPa or most preferably at least 3 GPa. The advantage of these fibers is that they have very high tensile strength, so that they are in particular very suitable for use in e.g. lightweight and strong articles.

Preferably the fineness per filament of the anti-ballistic fiber is less than 5 denier per filament (dpf), more preferably less than less than 3 dpf, even more preferably less than 2 dpf and most preferably less than 1.5 dpf.

The anti-ballistic fibers may be inorganic or organic fibers.

Suitable inorganic fibers are, for example, glass fibers, carbon fibers and ceramic fibers.

Suitable organic fibers with such a high tensile strength are, for example, aromatic polyamide fibers (generally referred to as aramid fibers), especially poly(p-phenylene terephthalamide), liquid crystalline polymer and ladder-like polymer fibers such as polybenzimidazoles or polybenzoxazoles, esp. poly(1,4-phenylene-2,6-benzobisoxazole) (PBO), or poly(2,6-diimidazo[4,5-b-4',5'-e]pyridinylene-1,4-(2,5-dihydroxy)phenylene) (PIPD; also referred to as M5) and fibers of, for example, polyolefins as e.g. polyethylene and polypropylene, polyvinyl alcohol, and polyacrylonitrile which are highly oriented, such as obtained, for example, by a gel spinning process.

More preferably aromatic polyamide fibers, especially poly (p-phenylene terephthalamide), liquid crystalline polymer and ladder-like polymer fibers such as polybenzimidazoles or polybenzoxazoles, especially poly (1,4-phenylene-2,6-benzobisoxazole) or poly(2,6-diimidazo[4,5-b-4',5'-e]pyridinylene-1,4-(2,5-dihydroxy)phenylene) and ultra high molecular weight polyethylene are used as anti-ballistic fiber.

In one embodiment of the present invention, the anti-ballistic fibers consist of ultra high molecular weight (UHMWPE) filaments that have been prepared by a gel spinning process, such as described, for example, in GB 2042414 A, WO 01/73173 or in "Advanced Fibre Spinning Technology", Ed. T. Nakajima, Woodhead Publ. Ltd (1994), ISBN 185573 182 7. The use of these UHMWPE fibers results in a very good anti-ballistic performance per unit of weight. A gel spinning process essentially consists of preparing a solution of a linear polyethylene with a high intrinsic viscosity, spinning the solution into filaments at a temperature above the dissolving temperature, cooling down the filaments to below the gelling temperature, such that gelling occurs, and stretching the filaments before, during or after the removal of the solvent.

In gel spinning embodiments, preferably linear polyethylene is used. Linear polyethylene is herein understood to mean polyethylene with less than 1 side chain per 100 C atoms, and preferably with less than 1 side chain per 300 C atoms; a side chain or branch generally containing at least 10 C atoms. Side chains may suitably be measured by FTIR on a 2 mm thick compression moulded film, as mentioned in e.g. EP 0269151. The linear polyethylene may further contain up to 5 mol % of one or more other alkenes that are copolymerisable therewith, such as propene, butene, pentene, 4-methylpentene, octene. Preferably, the linear polyethylene is of high molar mass with an intrinsic viscosity (IV, as determined on solutions in decalin at 135 degrees (° C.) of at least 4 dl/g; more preferably of at least 8 dl/g, most preferably of at least 10 dl/g. Such polyethylene is also referred to as ultra-high molar mass polyethylene. Intrinsic viscosity is a measure for molecular weight that can more easily be determined than actual molar mass parameters like $M_n$ and $M_w$. There are several empirical relations between IV and $M_w$, but such relation is highly dependent on molecular weight distribution. Based on the equation $M_w=5.37\times10^4 [IV]^{1.37}$ (see EP 0504954 A1) an IV of 4 or 8 dl/g would be equivalent to $M_w$ of about 360 or 930 kg/mol, respectively.

The weight per unit area of the anti-ballistic fiber in the sheet or monolayer preferably ranges form 5 to 250 g/m², more preferably ranges form 10 to 200 g/m², most preferably ranges form 20 to 150 g/m².

In the process according to the invention the stack may be made starting from sheets comprising a single monolayer instead of sheets (preferably unidirectional sheets) formed from 2 or more monolayers. However, sheets comprising single monolayers are difficult to handle, in that they easily tear in the fibre direction. It is therefore preferred to make the stack from consolidated monolayer packages or sheets containing from 2 to 8, typically 2, 4 or 8, monolayers that are placed at an angle with respect to the fibre direction, e.g. cross-wise. Consolidated is intended to mean that the monolayers are firmly attached to one another, so that the monolayers do not delaminate under normal use conditions at room temperature.

The fibers may also be orientated to form a woven or non-woven sheet.

The sheets of the present invention can be made with different methods, for example by calendaring between rolls, or by compression moulding. Very good results are achieved if also the monolayer packages (i.e. sheet or sheets comprising monolayers) are compressed at an elevated temperature, optionally at high pressure, and subsequently cooled under a high pressure; preferably of at least 5 MPa, even more preferably under the same pressure as during the previous step. If the economics permit, the formation of the unidirectional sheets may also be achieved using the combination of vacuum and high pressure within the scope of the present invention.

Flat Tape Formation

In a special embodiment of the present invention, the anti-ballistic fiber is a tape. The tape is preferably derived from polyolefin. A tape (or a flat tape) for the purposes of the present invention is a fiber with the cross sectional aspect ratio of at least 5:1, more preferably at least 20:1, even more preferably at least 100:1 and yet even more preferably at least 1000:1. The width of the flat tape is preferably between 1 mm and 600 mm, more preferable between 1.5 mm and 400 mm, even more preferably between 2 mm and 300 mm, yet even more preferably between 5 mm and 200 mm and most preferably between 10 mm and 180 mm. Thickness of the flat tape preferably is between 10 μm and 200 μm and more preferably between 15 μm and 100 μm.

In embodiments in which the anti-ballistic fiber is a flat tape, the flat tape may be prepared in the form of films. A tape may include or be derived from a film. A preferred process for the formation of such films or tapes comprises feeding a polymeric powder between a combination of endless belts, compression-moulding the polymeric powder at a temperature below the melting point thereof and rolling the resultant compression-moulded polymer followed by drawing. Such a process is for instance described in EP 0 733 460 A2, which is incorporated herein by reference. If desired, prior to feeding and compression-moulding the polymer powder, the polymer powder may be mixed with a suitable liquid organic compound having a boiling point higher than the melting point of said polymer. Compression moulding may also be carried out by temporarily retaining the polymer powder between the endless belts while conveying them. This may for instance be done by providing pressing platens and/or rollers in connection with the endless belts. Preferably UHMWPE is used in this process. This UHMWPE needs to be drawable in the solid state. Examples of commercial available solid state drawable UHMWPE includes GUR 4150™, GUR 4120™, GUR 2122™, GUR 2126™ manufactured by Ticona; Mipelon XM 220™ and Mipelon XM 221U™ manufactured by Mitsui; and 1900™, HB312CM™, HB320CM™ manufactured by Montell.

Another preferred process for the formation of films comprises feeding a polymer to an extruder, extruding a film at a temperature above the melting point of the film and drawing the extruded polymer film. If desired, prior to feeding the polymer to the extruder, the polymer may be mixed with a suitable liquid organic compound, for instance to form a gel, such as is preferably the case when using ultra high molecular weight polyethylene.

Preferably the polyethylene films are prepared by a gel process which has been previously described in relation to fiber formation. In short, the gel spinning process, in relation to tape formation, comprises preparing a solution of a polyolefin of high intrinsic viscosity, extruding the solution into a film at a temperature above the dissolving temperature, cooling down the film below the gelling temperature, thereby at least partly gelling the film, and drawing the film before, during and/or after at least partial removal of the solvent.

Drawing, preferably uniaxial drawing, of the produced films may be carried out by means known in the art. Such means comprise extrusion stretching and tensile stretching on suitable drawing units. To attain increased mechanical strength and stiffness, drawing may be carried out in multiple steps. In case of the preferred ultra high molecular weight polyethylene films, drawing is typically carried out uniaxially in a number of drawing steps. The first drawing step may for instance comprise drawing to a stretch factor of 3. Multiple drawing may typically result in a stretch factor of 9 for drawing temperatures up to 120° C., a stretch factor of 25 for drawing temperatures up to 140° C., and a stretch factor of 50 for drawing temperatures up to and above 150° C. By multiple drawing at increasing temperatures, stretch factors of about 50 and more may be reached. This results in high strength tapes, whereby for tapes of ultra high molecular weight polyethylene, the strength range is preferably 1.2 GPa to 3 GPa and higher strength may easily be obtained.

In embodiments in which the fiber is a tape, the tape may be orientated to form a woven sheet in addition to a unidirectional monolayer or sheet.

Thermoplastic Binder

The sheets preferably comprise a thermoplastic binder, particularly in embodiments in which the sheets are unidirectional sheets. The term binder refers to a material that binds or holds the anti-ballistic fibers together in the monolayer or sheet. The binder may enclose the anti-ballistic fibers in their entirety or in part, such that the structure of the monolayer is retained during handling and making of sheets. The binder may be applied in various forms and ways; for example as a thin layer film (by melting hereof at least partially covering the anti ballistic fibers), as a transverse bonding strip or as transverse fibers (transverse with respect to unidirectional fibers), or by impregnating and/or embedding the fibers with a matrix material, e.g. with a polymer melt, a solution or a dispersion of a polymeric material in a liquid. Preferably, matrix or binder material is homogeneously distributed over the entire surface of the monolayer, whereas a bonding strip or bonding fibers may be applied locally. Suitable binders are described in e.g. EP 0191306 B1, EP 1170925 A1, EP 0683374 B1 and EP 1144740 A1.

The advantage of a thermoplastic binder is that the binder emits a low level of volatile gases, especially at elevated temperatures.

Preferably, the binder is a thermoplastic material with an elongation at break of preferably greater than the elongation of the fibers. The binder preferably has an elongation of 2 to 600%, more preferably an elongation of 4 to 500%. Suitable thermoplastic binder materials are enumerated in, for example, WO 91/12136 A1 (pages 15-21). Preferred thermoplastic materials are thermoplastic polymer polyurethanes, polyvinyls, polyacrylics, polyolefins or thermoplastic elastomeric block copolymers such as polyisopropene-polyethylene-butylene-polystyrene or polystyrene-polyisoprene-polystyrene block copolymers are preferably selected as binder material.

In one embodiment, the binder consists of a thermoplastic polymer, which preferably completely coats the individual filaments of said fibers in a mono-layer, and which binder has a tensile modulus (determined in accordance with ASTM D638, measured at 25° C. of at least 250 MPa, more preferably of at least 400 MPa. Such a binder has a reduced release of volatile gases compared to thermosetting polymers. As a result, the absolute pressure in the reduced atmospheric environment may be maintained more readily.

In an alternative embodiment, the binder consists of a thermoplastic polymer with a tensile modulus (determined in accordance with ASTM D638, measured at 25° C.) of at less than 250 MPa, more preferably less than 100 MPa, even more preferably less than 40 MPa, yet even more preferably less than 20 MPa and most preferably less than 2 MPa.

Preferably, the binder is applied as a dispersion in water. Examples of suitable binder materials include: acrylates, polyurethanes, modified polyolefins and ethylene vinyl acetate.

Impregnation of the reinforcing fibres with the thermoplastic binder material can for instance be effected by applying one or more thin layer films of the thermoplastic to the top, bottom or both sides of the plane of the fibres and then passing these, together with the fibres, through heated pressure rolls. Preferably, however, the fibres, after being oriented in parallel fashion in one plane, are coated with an amount of a liquid substance containing the thermoplastic binder material of the monolayer. The advantage of this is that more rapid and better impregnation of the fibres is achieved. The liquid substance may be for example a solution, a dispersion or a melt of the thermoplastic. If a solution or a dispersion of the thermoplastic is used in the manufacture of the monolayer, the process also comprises evaporating the solvent or dispersant.

Alternatively, the binder may be applied locally across the anti-ballistic fibers, thereby minimising the amount of binder used whilst enabling the anti-ballistic fibers to be sufficiently stable for handling and processing, which the stack of sheets undergoes in the subsequent vacuumisation step.

The amount of binder in the sheet is preferably at most 30 wt. %, more preferably at most 20 wt. %, even more preferably at most 15 wt. % and most preferably less than 10 wt. %, relative to the total weight of the anti-ballistic fibers and the binder in the stack. To provide sufficient stability within the sheet, the sheet preferably comprises at least 3 wt. % and more preferably at least 5 wt. % binder relative to the total weight of the anti-ballistic fibers and the binder in the stack. In some embodiments of the present invention, no additional binder is required to be added to the fibers. For instance, stacks derived from woven flat tape sheets may be sufficiently stable to be processed without requiring additional binders. In general, the lower the binder content, the higher the SEA of the stack of unidirectional sheets.

The stack according to the invention has a weight, in this application also referred to as areal density, which spreads over a wide range, encompassing both flexible and rigid constructions. Beneficial effects of the application of vacuum in accordance with the present invention have been observed down to levels of about 2.0 kg/m$^2$ or even less. However, it is preferably that the stack has an areal density of at least 6.0 kg/m$^2$, more preferably of at least 8.0 kg/m$^2$. In alternative embodiments, such as those relating to stacks used in armoured vehicles, areal densities of at least 15 kg/m$^2$, more preferably at least 20 kg/m$^2$ and even more preferably at least 30 kg/m$^2$ are used.

Higher areal densities achieved through the use of a higher number of monolayers or sheets in the stack have been found to produce particularly good anti-ballistic performance under the scope of the present invention.

Reduced Atmospheric Pressure Environment

The fact that the application of a reduced atmospheric pressure environment in combination with high pressure according to the present invention was found not to measurably change the density of the stack compared to the application of high pressure alone, makes the resultant technical effect even more unexpected.

A reduced atmospheric pressure environment means an environment in which the atmospheric pressure is less than one atmosphere (approximately 0.1 MPa). To subject the stack to a reduced atmospheric environment a suction or vacuum source is connected to an enclosure defining the reduced atmospheric pressure environment.

Preferably, the enclosure is formed from a flexible material such that when vacuum is applied to the enclosure, the flexible material is drawn around the stack, thereby stabilising and preventing relative movement between the sheets forming the stack. By securing the stack within the flexible material, the stack may be handled and transported quickly and efficiently during the production cycle. This has the advantage of speeding up production and/or enabling lower amounts of binder to be used to stabilize the stack.

In one embodiment, the stack is placed in a vacuum bag to enable a vacuum source, such as a vacuum pump, to reduce the atmospheric pressure within the vacuum bag to below atmospheric pressure. The vacuum bag is preferably configured such that it encompasses the stack in full so that vacuum can be applied to the stack through a vacuum port. The vacuum bag is preferably a flexible polymeric sheet which fully encompasses the moulded article and which comprises an opening or vacuum port from which suction is applied to the gaseous environment within the vacuum bag. However, in some embodiments, the reduced atmospheric pressure environment is a vacuum chamber defined by a vacuum bag in combination with a rigid surface, such as a mould.

Preferably, the vacuum port is formed in-situ (e.g. the vacuum bag is formed by heat sealing a polymeric sheet, with a hole in the vacuum bag left to serve as the vacuum port) and subsequently sealed after vacuum has been applied to the vacuum bag. In an exemplary embodiment, the vacuum bag is formed from at least one polymeric sheet. The at least one polymeric sheet may be preformed into a vacuum bag or formed in-situ. Where the vacuum bag is formed in-situ, two surfaces of the polymeric sheet are clamped around the stack to form an enclosure comprising a vacuum port. After vacuum is applied to the stack through the vacuum port, the enclosure is preferably heat sealed, thereby forming the vacuum bag.

The vacuum bags are preferably made from a polymeric sheeting material having a melting temperature above the vacuum bag processing temperature, such as polyethylene, especially low density polyethylene, polypropylene, polyester or polyamide. Multilayered laminate constructions may also be used. For example, a tri-layered polymer laminate consisting of a low density polyethylene layer, a polyamide layer and a interfacial "tie" layer which has favourable rheological characteristics to enable the low density polyethylene layer and the polyamide layer to be extruded into a laminate film. In a further embodiment, a layer of the laminate forming at least part of the vacuum bag comprising an aluminum foil layer, which functions as a flame barrier.

The vacuum bag may be designed for single or multi-use application with the composition and thickness of the vacuum bag being modified by means known in the art. Single use vacuum bags are preferred when the vacuum bag is designed to form part of the final anti-ballistic article or when the vacuumization step and the compression step are performed at different locations, thereby making the re-use of bags uneconomical.

In a special embodiment, the vacuum bag is made from a polymeric sheeting material having a melting temperature at or below a maximum vacuum bag processing temperature (step c). Preferably, the polymeric sheet has a melting point no more than 10 degrees Celsius (° C.) and more preferably no more than 5° C. below the maximum vacuum bag processing temperature (step c). It has been unexpectedly found that vacuum bags having a melting temperature at or below the vacuum bag maximum processing temperature are still able to produce the technical effect attributable to the present invention.

In a preferred embodiment, the vacuum bag forms an integral part of the anti-ballistic article during processing. With the outer layer of the stack comprising a polymeric sheet of the vacuum bag, additional functional properties may be added to the outer surface of the anti-ballistic article. In particular, the printability of the outer layer may be enhanced through applying a vacuum bag made from a polymeric material of good printability or of a polymeric material which has been treated (e.g. corona discharge) to enhance is printability.

The vacuum bag may be also produced from at least one printed polymeric sheet, such that the anti-ballistic article obtains a printed outer layer through the integration of at least one surface of the vacuum bag onto an outer surface of the anti-ballistic article. The integration of the vacuum bag onto the surface of the anti-ballistic article has the advantage of reducing the processing time to produce the final article by eliminating at least one post compression cycle processing step.

The vacuum bag may be integrated onto the outer surface of the moulded article through use of vacuum bag material which forms an integral bond with the outer surface of the stack, while still forming an integral seal such that vacuum is maintained during the application of the high pressure cycle. This may be achieved through the use of a binding or adhesive agent to bond a surface of the vacuum bag onto a surface of the anti-ballistic article. Alternatively, the vacuum bag may be made from a material which has a softening point below the maximum processing temperature (step c), such that the material binders to the outer surface during processing. Preferably, the softening point of the vacuum bag material is at no more than 40° C., more preferably no more than 30° C. and most preferably no more than 20° C. below the maximum processing temperature (step c). Preferably, a heat activated adhesive is precoated onto an inner surface of the vacuum bag with the heated compression cycle activating the adhesive thereby forming a bond between a surface of the vacuum bag and an outer surface of the anti-ballistic article.

Alternatively, at least a side or a portion of the vacuum bag may comprise a polymeric composition which has a melting temperature below the maximum compression cycle temperature, whereby during the compression cycle at least a side or portion of the vacuum bag thermally fuses onto an outer layer of the anti-ballistic article.

In operation, a stack is inserted into a vacuum bag, as previously described, with a vacuum source applied to the contents of the vacuum bag. Preferably, the absolute gaseous pressure in the reduced atmospheric pressure environment is no more than 0.01 MPa. More preferably, the absolute gaseous pressure in the reduced atmospheric pressure environment is no more than 0.005 MPa even more preferably no more than 0.001 MPa and most preferably no more than 0.0005 MPa. In general, lower pressure levels correspond to increased anti-ballistic performance. The vacuum level is measured from a vacuum gauge or other measurement means which is typically attached to the vacuum source.

To reach the required absolute pressure, the reduced atmospheric pressure environment is attached to a vacuum source for preferably at least 20 seconds, more preferably at least 60 seconds and most preferably at least 180 seconds. The exact vacuumisation time will depend upon the configuration of the vacuum port, vacuum bag and stack. For instance, in embodiments in which the anti-ballistic article is formed from a high number of unidirectional sheets (eg. greater than 100), then a longer time may be required to ensure that an equilibrium level has been reached in terms of the gaseous pressure throughout the reduced atmospheric pressure environment (i.e. the pressure is substantially the same throughout the bag). The exact vacuumisation time may be determined through routine experimentation by those skilled in the art.

The vacuum processing step (b) may be undertaken in a dedicated vacuum press, in which the stack is placed in a vacuum bag comprising a vacuum port and placed in the vacuum press. The vacuum bag is then enclosed in a chamber which is subjected to a reduced atmosphere. Upon completion of the vacuuming step, the vacuum port is preferably heat sealed and the bagged stack removed from the press.

An advantage of this embodiment using a dedicated vacuum press is that number of stacks may be vacuum pressed in advance to ensure productivity of the high pressure processing equipment is maximized. Indeed, the stacks may be vacuum packed, stored and transported to a different production facility to undergo the compression cycle in a dedicated high pressure press. As a result, the stack may be under vacuum, prior to the compression cycle, from as little as 30 seconds to no more than 3, hours, preferably no more than 4 hours and in some embodiments no more than 2 days, and preferably no more than 3 days or more.

An advantage of having the stacks vacuum packed is that monolayers or preformed integral stacks of monolayers may be secured into position with a lower reliance on binder materials and/or careful handling. As a consequence, improved production speeds and improved anti-ballistic performance may be achieved simultaneously.

Alternatively to using a dedicated vacuum press, the stack may be exposed to the reduced atmospheric gas environment within a vacuum chamber, which forms part of the pressurizing means, such as a hydraulic press.

In embodiments in which the stack is only partially covered by the vacuum bag, the vacuum bag is preferably attached to a component of the moulding apparatus, such that the stack is fully encompassed by the combination of a flexible sheet from the vacuum bag or cover and a rigid surface of the moulding apparatus. Preferably vacuum apertures or ports are evenly distributed over the base of the moulding apparatus. An even distribution of apertures avoids an uneven distribution of vacuum over the stack. In some embodiments, the vacuum apertures are connected to vacuum a cavity inside the moulding apparatus which are connected with stop reverse sealed valves and vacuum tubing for connecting to a vacuum pump.

In a further embodiment of the present invention there is provided use of vacuum in the manufacture of anti-ballistic articles, especially anti-ballistic articles derived from anti-ballistic fibers. Preferably, the use of vacuum is achieved using a vacuum bag as previously described.

In a preferred embodiment, the consolidation step (c) is conducted as part of a compression cycle as follows:

Compression Cycle

After the stack has been placed in the reduced pressure environment, the stack preferably undergoes a compression cycle at an elevated temperature. Compression at an elevated temperature is intended to mean that the stack is subjected to a given pressure for a particular compression time at a compression temperature sufficiently high such that the modulus of the binder is sufficiently low (e.g. temperature is above the glass transition or melting temperature of the binder), but below the softening or melting point of the fibers. The required compression time and compression temperature depend on the kind of fiber and binder and on the thickness of the moulded article and can be readily determined by one skilled in the art. The temperature during melting or reacting generally is chosen below the temperature at which the anti-ballistic fiber looses its high mechanical properties due to e.g. melting.

The first step in the compression cycle is to preheat the stack to a temperature sufficient to enable the consolidation of the stack (i.e. good adhesion between sheets).

In embodiments in which the stack is formed from anti-ballistic fibers with a relatively low melting point, such as polyolefins, the stack is preheated to a temperature of typically at least 10° C., preferably at least 20° C. and more preferably at least 25° C. below the melting temperature of the anti-ballistic fiber.

In the case of UHMWPE fibers, often having a melting temperature of 155° C., a temperature below 145° C. generally will be chosen and more preferably below 135° C. The minimum temperature generally is chosen such that a reasonable speed of consolidation is obtained. In this respect 50° C. is a suitable lower temperature limit, preferably this lower limit is at least 75° C., more preferably at least 95° C., most preferably at least 115° C. In an exemplary embodiment, the stacks derived from UHMWPE fibers are heated to a temperature of between 120° C. to 130° C. The preheating step typically takes place over a period of 10 minutes to 2 hours depending upon the specific heat transfer parameters inherent in the materials used.

The second step in the compression cycle is a high pressure compression step, in which the stack is compressed by a pressuring means under a load of at least 10 MPa, more preferably at least 12 MPa, more preferably at least 15 MPa, even more preferably at least 20 MPa, yet even more preferably at least 25 MPa and most preferably at least 30 MPa. The compression cycle is typically initiated before the first step is complete (i.e. the temperature of the stack is still increasing).

The time the stack is exposed to the high pressure conditions is generally between 5 and 100 minutes, depending upon the processing conditions, such as temperature, pressure, composition and number of unidirectional sheets in the stack.

The third step in the compression cycle is the subsequent cooling of the stack to a temperature below 100° C., preferably below 80° C. and more preferably below 60° C. In a preferred embodiment, the stack is cooled while still under pressure, preferably of at least 5 MPa, more preferably under the same pressure as in the preceding pressing step.

The anti-ballistic article obtained by the process of the present invention is preferably a curved moulded article, such as a helmet or an armoured plate which conforms to the contours of a vehicle's panel.

In embodiments in which the anti-ballistic article is a curved article, step (c) further comprising placing the stack in a mould, wherein consolidating of the stack takes place, and the mould is at least partly pressurized by the pressurizing means. The mould comprises at least one mould part in the form of the curved or shaped article—either conforming with the top surface and/or the bottom surface of the stack—and/or a peripheral mould part.

The resultant anti-ballistic article possesses excellent anti-ballistic performance.

The invention also relates to an anti-ballistic article obtainable according to the process used to produce it as previously described. In particular, the anti-ballistic articles, as previously described, show distinct technical features compared to conventional anti-ballistic articles.

For the purposes of the present invention, pressure is denoted in units of Mega Pascal (MPa) or bar, in which 1 MPa is taken to equal 10 bar.

EXAMPLES

Example 1

A stack of 73 unidirectional sheets (about 40 cm by about 40 cm) each consisting of two monolayers disposed crosswise at an angle of 90 degrees. The anti-ballistics fibres were highly-drawn fibres of UHMWPE with a strength of about 36 cN/dtex, a modulus of about 1180 cN/dtex and a fineness of about 2 denier per filament with a cross-section aspect ratio of about 1. Each monolayer contains 20 wt. % binder, relative to the total weight of the monolayer, consisting of a styrene-isoprene-styrene triblock copolymer composition having a tensile modulus value of about 1 MPa at 25° C. determined in accordance with ASTM D638 (available from Kraton Polymers), which is applied as an aqueous dispersion. The areal density of the unidirectional sheet was 265 g/m². The areal density of the stack/anti-ballistic article was about 19 kg/m².

The stack was placed into a polyamide 6 vacuum bag with a reduced atmospheric pressure of about 5 mBar ($5 \times 10^{-4}$ MPa) applied to the stack by means of a vacuum pressure applied from a stand alone apparatus designed to vacuum seal articles in a polymeric film. Suction was through the opening of the vacuum bag for approximately 25 seconds prior to the bag being heat sealed and removed from the vacuum source.

The stack sealed in a reduced atmospheric pressure environment was then transferred to a heated hydraulic press. The stack was heated to above 60° C. prior to a pressure of 300 bar (30 MPa) being applied to the stack for about 45 minutes at which the maximum temperature reached was approximately 125° C. While the 300 bar pressure was maintained the temperature was decreased to less than 80° C. prior to the opening of the press and the removal of the stack. Upon further cooling, the stack/anti-ballistic article was removed from the bag.

Comparative Experiment A

The stack of comparative experiment A (equivalent in composition and structure to the stack of Example 1) was processed in the same way as the stack of Example 1 with the exception that:

the stack was not placed in a vacuum bag and was not subjected to a reduced atmospheric pressure environment; and prior to the application of the 300 bar pressure, the stack was subjected to a degassing step for 5 minutes. The degassing step was conducted by compressing the stack to a pressure of 10 bar, reduce the pressure by opening the mould (whereby the stack experiences atmospheric pressure) and wait for 5 minutes before the application of the 300 bar pressure.

Examples 2 to 3

Example 2 is a repeat of Example 1; Example 3 is the same as Example 1, except that the consolidation pressure was 165 bar.

Comparative Experiments B, C, D and E

Comparative experiment B is a repeat of Comparative experiment A. Comparative experiments C, D and E are equivalent to Comparative experiment A but were compressed using different pressures, and in one case also by using vacuum. The conditions were as follows:
Comparative experiment B at 30 MPa pressure,
Comparative experiment C at 16.5 MPa,
Comparative experiment D at 2.0 MPa (with vacuum: 5 mbar) and
Comparative experiment E at 2.0 MPa (without vacuum).

Except for the comparative experiment E, all experiments were performed in duplicate.

The results of the examples and comparative experiments are provided in FIG. 1. Duplicate test results are indicated as, for example, comparative experiment B by the labels B-1 and B-2.

Density

The density of the samples was determined by weighing approximately 50 grams of each sample in duplicate and immersing the samples in ethanol and measuring the displacement volume of ethanol. The density was then determined by dividing the weight of the samples by its volume, with an average of the duplicate reported in table 1.

Ballistic Performance

Stacks in the form of armoured plates were subjected to shooting tests performed using an AK47 7.62×39 mm Mild Steel Core (MSC) bullet manufactured by Sellier & Belliot, Czech Republic. The first shot was fired at a projectile speed at which it is anticipated that 50% of the shots would be stopped ($V_{50}$ value). The actual bullet speed was measured at a short distance before impact. If a stop was obtained, the next shot was fired at an anticipated speed being 20 m/s higher than the previous speed. If a perforation occurred, the next shot was fired at a speed being 20 m/s lower than the previous speed. The result for the experimentally obtained $V_{50}$ value was determined using logistical regression analysis. The kinetic energy of the bullet at $V_{50}$ was divided by the total areal density of the plate, thus reaching the so-called SEA value.

TABLE 1

| | Example 1 | Comparative Experiment A |
|---|---|---|
| SEA (J/Kg/m$^2$) | 157 | 145 |
| Density (g/cm$^3$) | 0.952 | 0.959 |

The results from Table 1 illustrate that the combination of a reduced atmospheric environment in combination with high pressure results in an improvement in SEA of about 8%. The results also confirm that the use of a reduced atmospheric pressure environment in combination with high pressure produces a similar densification effect as the degassing step in the comparative example, which is the conventional approach to consolidating a stack as taught in GB 2253420.

Dimensional Stability.

Twenty two panels were produced and tested according to Example 1 to 3 and the corresponding comparative experiments. Half of the panels (11 panels) were tested for anti-ballistic performance (without thermal conditioning), as described above. The other half of the panels were each marked at 16 positions in a grid equally spaced 10 cm apart and 5 cm from the edges (or the equivalent ratio thereof). The panels were matched such that adjacent panels cut form the same main panel were used to pair anti-ballistic and dimensional stability results. The original thickness of the panel at each of the predefined position were measured, with the variation across the panels found to be less than 1% (or less than 0.2 mm) and in most instances less than 0.5% (less than 0.1 mm). The panels were placed on trays in an oven set at 90° C. for 160 hours (thermal conditioning). At regular intervals of no less than 24 hours, the panels were removed from the oven and the thickness of the predefined positions measured. In addition, the maximum thickness of any position on the board was also measured. The panel thickness was measured and returned to the oven within 10 minutes and preferably within 5 minutes of the panels being removed from the oven for measurement. Under this procedure, the temperature of the panels when measured is considered to be about the same as temperature in the oven (i.e. about 90° C.). This process was repeated until the maximum % increase in thickness had reached a maxima.

The change in the average thickness and maximum panel thickness was determined from the measurement data. It was observed that the maximum panel thickness was recorded in the central portion of the panels with the dimensional change increasing from the predefined positions around the periphery to the 4 central predefined positions. A graph correlating the relationship between dimensional stability (maximum thickness increase ($\Delta T$)) and anti-ballistic performance is provided in FIG. 1.

The results (FIG. 1) indicate that the application the application of pressure and vacuum to a stack of sheets during the consolidation step of the present invention, results in articles having improved anti-ballistic performance in addition to improved dimensional stability. Indeed, for conventional anti-ballistic articles to be produced with comparable anti-ballistic performance then a consolidation pressure of 30 MPa is required compared to only 16.5 MPa using the vacuum technology of the present invention (compare comparative experiment B-2 and example 3-1). However, even when conventional articles are produced with equivalent anti-ballistic performance to that of the present invention, the associated dimensional stability is only about half that of the articles produced under the scope of the present invention (FIG. 1). Thus, the articles produced under the scope of the present invention are distinct from conventional articles.

Surprisingly, this technical effect is not seen at lower pressures outside the scope of the present invention and, in fact, vacuum applied at lower pressures (2.0 MPa) actually leads to a slight decrease in anti-ballistic performance (D-1, D-2 and E-1).

The invention claimed is:

1. A process for the manufacture of an anti-ballistic article comprising the steps of:
    (a) forming a stack of sheets by stacking 2 or more sheets, each sheet comprising one or more mono-layers of anti-ballistic fibers, followed by
    (b) subjecting the stack of sheets to a reduced atmospheric pressure environment having an absolute gaseous pressure of no more than 0.1 MPa; and
    (c) while maintaining the reduced atmospheric pressure environment, consolidating said stack of sheets to a pressure of at least 10 MPa at an elevated temperature of at least 10° C. below either a melting temperature of the anti-ballistic fibers or a temperature at which the anti-ballistic fibers lose mechanical properties.

2. The process according to claim 1, wherein the sheets are unidirectional sheets and the direction of the anti-ballistic fibers in the sheets is at an angle $\alpha$ to the fiber direction in an adjacent mono-layer.

3. The process according to claim 1, wherein each sheet further comprises a thermoplastic binder.

4. The process according to claim 3, wherein the thermoplastic binder content is in the range of at least 5 wt % to at most 30 wt % relative to the total weight of anti-ballistic fibers and the binder in the stack.

5. The process according to claim 1, wherein the stack of sheets is subjected to a reduced atmospheric pressure environment by placing the stack of unidirectional sheets into a vacuum bag and connecting a vacuum source to said bag.

6. The process according to claim 5, wherein at least a portion of the vacuum bag forms part of the anti-ballistic article.

7. The process according to claim 1, wherein each sheet in the stack comprises two or more monolayers of unidirectional anti-ballistic fibers and a thermoplastic binder.

8. The process according to claim 1, wherein the stack of sheets has an areal density of at least 2 kg/m$^2$.

9. The process according to claim 1, wherein the anti-ballistic fibers have a cross sectional aspect ratio of greater than 5:1.

10. The process according to claim 1, wherein at least one monolayer comprises a plurality of fibers, aligned such that the fibers form a woven sheet.

11. The process according to claim 1, wherein step (c) further comprises placing the stack of sheets into a curved mould prior to consolidating the stack into the curved mould, thereby forming a curved anti-ballistic article.

12. The process according to claim 1, wherein steps (b) and (c) occur co-currently.

13. The process according to claim 5, wherein the vacuum bag has a melting temperature at or below the elevated temperature according to step (c).

14. The process according to claim 1, wherein step (b) is practiced at a reduced atmospheric pressure environment having an absolute gaseous pressure of no more than 0.005 MPa.

15. The process according to claim 1, wherein step (b) is practiced at a reduced atmospheric pressure environment having an absolute gaseous pressure of no more than 0.001 MPa.

16. The process according to claim 1, wherein step (b) is practiced at a reduced atmospheric pressure environment having an absolute gaseous pressure of no more than 0.0005 MPa.

17. The process according to claim 1, wherein step (c) is practiced at an elevated temperature of at least 20° C. lower than the melting temperature of the anti-ballistic fibers.

18. The process according to claim 1, wherein step (c) is practiced at an elevated temperature of at least 25° C. lower than the melting temperature of the anti-ballistic fibers.

* * * * *